United States Patent [19]

Alpert et al.

[11] Patent Number: 5,452,457

[45] Date of Patent: Sep. 19, 1995

[54] PROGRAM CONSTRUCT AND METHODS/SYSTEMS FOR OPTIMIZING ASSEMBLED CODE FOR EXECUTION

[75] Inventors: Alan I. Alpert, Hopewell Junction; Paul G. Greenstein, Fishkill; John T. Rodell, Wappingers Falls, all of N.Y.; Ramanathan Raghavan, Austin, Tex.

[73] Assignee: International Business Machines Corporation, Armonk, N.Y.

[21] Appl. No.: 11,051

[22] Filed: Jan. 29, 1993

[51] Int. Cl.[6] ............................................. G06F 9/45
[52] U.S. Cl. .............................. 395/700; 364/DIG. 1; 364/280.5; 364/261.5
[58] Field of Search ........................................ 395/700

[56] References Cited

U.S. PATENT DOCUMENTS

| | | | |
|---|---|---|---|
| 4,435,759 | 3/1984 | Baum et al. | 364/DIG. 1 |
| 4,642,765 | 2/1987 | Cocke et al. | 364/DIG. 1 |
| 4,736,318 | 4/1988 | Delyani et al. | 364/DIG. 1 |
| 4,802,091 | 1/1989 | Cocke et al. | 364/DIG. 1 |
| 4,833,599 | 5/1989 | Colwell et al. | 364/DIG. 1 |
| 4,908,750 | 3/1990 | Jablow | 364/DIG. 1 |
| 4,974,151 | 11/1990 | Advani et al. | 364/DIG. 1 |
| 5,109,331 | 4/1992 | Ishida et al. | 395/375 |
| 5,121,501 | 6/1992 | Baumgartner et al. | 395/800 |

FOREIGN PATENT DOCUMENTS

0442624A2  8/1991  European Pat. Off. .

OTHER PUBLICATIONS

Grohoski, G. F., "Machine Organization of the IBM RISC System 1000 Processor," IBM Journal of Research and Development, vol. 34, No. 1, pp. 43–46, Jan. 1990.

Hennessy et al. *Computer Architecture: A Quantitative Approach*, 1st Edition, pp. 272–277 & 307–312, 1990.

*Primary Examiner*—Thomas M. Heckler
*Attorney, Agent, or Firm*—Lawrence D. Cutter; Kevin P. Radigan; Jeff Rothenberg

[57] ABSTRACT

In one aspect, a software development technique is capable of efficiently organizing for execution a conditional code segment having multiple associated conditional paths. The development technique employs in association with each path of the code segment, a probability compiler directive which dictates to the compiler a probability for satisfying a conditional test of the associated path. In another aspect, a system/process is capable of optimizing organization of assembled program code for a code's particular execution environment. This optimization approach tunes assembled code organization for each specific execution environment, employing run-time based statistical data collected during performance execution of the assembled code. The execution environment, consisting of hardware, software, and other factors such as workload, input data, etc., can also be collected and employed by an optimizer unit to best reorganize the assembled program code for a current execution environment.

18 Claims, 4 Drawing Sheets fig. 1

| INSTRUCTION ADDRESS | NUMBER OF FETCHES | NUMBER OF CACHE MISSES ON INSTRUCTION FETCH | NUMBER OF CACHE MISSES ON OPERAND 1 FETCH | NUMBER OF CACHE MISSES ON OPERAND 2 FETCH | |
|---|---|---|---|---|---|
| NUMBER OF ITERATIONS THROUGH THE ADDRESS RANGE: | | | | | |
| ... | ... | ... | ... | ... | ... |
| ... | | | | | ... | fig. 4 fig. 2 fig. 3 fig. 5

| | 0501 INITIAL OBJECT CODE | 0524 OPTIMIZED OBJECT CODE | |
|---|---|---|---|
| | ... ... | ... ... | |
| PAGE BOUNDARY 0502 → | 0509  BC 1<br>0510  − A1 − | 0525  BC 1<br>0526  − A1 − | CACHE BOUNDARY 0540 |
| | ... | ... | CACHE BOUNDARY 0541 |
| | 0511  − B1 − | 0527  BC 2 | |
| PAGE BOUNDARY 0503 → | ...<br>0512  BC 2 | 0528  − A2 −<br>... | CACHE BOUNDARY 0542 |
| | 0513  − B2 −<br>... | 0529  BC 3<br>0530  − A3 − | CACHE BOUNDARY 0543 |
| PAGE BOUNDARY 0504 → | 0514  − A2 −<br>... | ...<br>0531  BC 4 | CACHE BOUNDARY 0544 |
| | 0515  BC 3<br>0516  − B3 − | 0532  − A4 −<br>... | CACHE BOUNDARY 0545 |
| PAGE BOUNDARY 0505 → | ...<br>0517  − A3 − | 0533  BC 5<br>0534  − A5 — | CACHE BOUNDARY 0546 |
| | ...<br>0518  BC 4 | ...<br>0535  − B1 − | CACHE BOUNDARY 0547 |
| PAGE BOUNDARY 0506 → | 0519  − A4 −<br>... | ...<br>0536  − B2 − | CACHE BOUNDARY 0548 |
| | 0520  − B4 −<br>... | ...<br>0537  − B3 − | CACHE BOUNDARY 0549 |
| PAGE BOUNDARY 0507 → | 0521  BC 5<br>0522  − B5 − | ...<br>0538  − B4 − | CACHE BOUNDARY 0550 |
| | ...<br>0523  − A5 − | ...<br>0539  − B5 − | CACHE BOUNDARY 0551 |
| PAGE BOUNDARY 0508 → | ... | ... | CACHE BOUNDARY 0552 |

PROGRAM CONSTRUCT AND METHODS/SYSTEMS FOR OPTIMIZING ASSEMBLED CODE FOR EXECUTION

TECHNICAL FIELD

The present invention relates in general to the fields of software development and performance monitoring, and in particular, to a novel program construct and tuning methods/systems for generating an efficient organization of compiled program code for enhanced execution performance in any given environment.

BACKGROUND ART

Extensive research has been directed to improving available software development and performance monitoring techniques for generating efficient organization of program code. In writing code for any programming language, a programmer must be aware of software performance. One type of programming construct that may affect performance at execution time is the familiar conditional constructs such as an IF-THEN-ELSE statement of PL/I, an IF-THEN-ELSIF-ELSE statement of FORTRAN-78, a SWITCH-CASE statement of C, etc. The high impact of such constructs arises in numerous computers as described below.

In many of the data processing units available today, instructions are executed in a pipelined manner, with consecutive instructions in the instruction stream being in different stages of execution at any given time. As a result, the processor must determine, at each instant, which instruction will be executed next, prefetch that instruction and input it to the pipeline. The pipelined execution of instructions proceeds in an orderly manner until a branch instruction is encountered. If it is an unconditional branch instruction, the processor will be able to compute the target address, initiate prefetching of instructions from the target address and continue to fill the pipeline.

A problem occurs, however, for a conditional branch instruction which branches to a target address only if a specified condition is satisfied. In this case, the processor unit may not know at the time of fetching the branch instruction whether the branch will actually take place in the future, i.e., once the branch instruction is finally executed, and hence may not be able to prefetch the correct instructions each time.

In the more sophisticated and expensive systems, such as the IBM ESA/390 mainframe computer, the processor unit includes separate hardware to predict which way a branch should go for a conditional branch instruction. Because this function requires a lot of hardware to implement, however, it is generally not provided in today's workstations, such as the IBM RISC System/6000 and personal computers. In such systems, when a conditional branch instruction is encountered, the processor unit simply makes an assumption that the branch will not be taken and continues to prefetch the instructions following the conditional branch instruction. If the assumption made by the processor is correct, then pipeline execution proceeds smoothly.

If, however, the processor assumes wrong, then previously prefetched instructions starting from the one following the conditional branch instruction will have to be discarded, with the processor state being restored if necessary, and the instructions from the branch target address will have to be fetched. This process breaks pipeline execution and results in performance degradation lasting several processor cycles. The problem is further exacerbated when the target address happens to lie in a different cache line and a cache miss occurs while fetching the instructions at the target address, leading to a time-consuming main store operation.

One common practice to reducing cache misses under such a condition is for the programmer to insert calls to sub-routines to handle conditional cases less likely to occur, and leave program code in the mainline for the conditional cases most often to occur. This solution requires that the programmer be aware at the time of writing the code of the likelihood of satisfying each condition. Unfortunately, this information is infrequently available in practice. Rather, what happens instead is that traditional performance-test runs point out which conditional cases occur most commonly and this information is then used by the programmer to reorganize the high-level language source code in an attempt to enhance performance of the assembled code.

In a more general aspect, most compilers/optimizers employed today are incapable of optimizing program code based on an unknown execution environment. The ultimate execution environment for a program consists of hardware (such as cache organization, storage geometry, configuration characteristics including-vectors, multi- or uniprocessor (MP/UP), central/expanded storage, co-processors, channel characteristics, relative instruction execution speeds, etc.) and software/external factors (such as program workload, usage of a program, input to a program, location of a program and data, etc.). Typically, available compilers/optimizers either require that at least some of this information on the ultimate execution environment be known or specified ahead of time, i.e., before producing an assembled code, or simply ignore the unknown environmental factors.

Often compilers do provide options which enable a programmer to manually select how a program should be optimized. However, such optimization options are static mechanisms which do not allow dynamic adjustment for changes in the execution environment, nor do they allow a programmer to be aware of changes in the execution environment. Traditional optimization concepts also include manually tuning programs to a given processor model, and obtaining machine-specific information by, for example, running benchmarks, maintaining processor tables and keying off a processor model, etc. In addition, optimizers, loaders and object modules have been used in association with compilers to optimize program compilation for improved execution performance of the assembled code for a specified processing system.

Commercial advantage is obtained in the highly competitive software development industry to the extent that high-level language code can be optimized for enhanced execution performance. Therefore, optimization techniques capable of optimizing organization of assembled code for conditional constructs and accounting for a program's unknown execution environment are believed significant.

DISCLOSURE OF INVENTION

Briefly summarized, the present invention comprises in one aspect a conditional code segment which includes at least two associated conditional paths and at least two probability compiler directives. Each probability compiler directive is associated with a different one of the conditional paths and each indicates a probability for satisfying a test condition of the associated conditional path when the code segment is executed by a processor. By way of example, the conditional code segment may comprise an IF-THEN-ELSE statement of PL/I, an IF-THEN-ELSIF-ELSE statement of FORTRAN-78 or a SWITCH-CASE statement of C.

A method for assembling such a conditional code segment is also presented. This method includes: associating a different one of multiple probability compiler directives with each path of a conditional code segment (again, each compiler directive is assigned an approximate probability for satisfying the test condition of the associated conditional path when the instruction is executed by a processor); and compiling the conditional code segment as an assembled code segment according to the assigned probabilities in the probability compiler directives. The compiling step includes arranging the conditional code segment such that the conditional paths are placed in the assembled code segment in a manner best suited for execution by the processor. Preferably, the method further includes: performance testing the assembled code segment; simultaneously collecting execution data on the conditional paths; returning to the conditional code segment and re-assigning probabilities in the compiler directives based upon the performance test results; and re-compiling the revised conditional code segment into a revised assembled code segment with enhanced processor execution characteristics.

In another aspect of the present invention, a method is presented for optimizing assembled code organization for execution on a processor system using existing data. This method includes the steps of: executing the assembled code on the processor system using the available data; simultaneous with executing the assembled code, accumulating execution statistics on the assembled code within the processor system's execution environment; and automatically re-configuring the assembled code organization to improve execution performance based on the execution statistics collected. Further, specific details of this optimization method are also presented herein.

In addition, a system for enhancing compiling and execution of a high-level language code is set forth. The system includes a compiler for compiling the high-level language code into an assembled code and first memory means for holding the assembled code for execution. A processor executes in a dynamic execution environment the assembled code held in the first memory means. Collecting means coupled to the processor accumulates execution statistics on the assembled code executed by the processor. An optimization package then re-configures, using compiler optimization techniques (as specified herein or as existing in the art), the assembled code using the accumulated execution statistics and outputs a re-configured assembled code optimized for the processor's execution environment.

To summarize, a first aspect of the present invention focuses on optimizing organization of multiple associated conditional paths of a conditional code segment. With a new compiler directive associated with each conditional path, a programmer only has to specify a new probability (for example, obtained from performance test runs) and re-compile the source code to generate a more efficient assembled code. Thus, a programmer may concentrate on perfecting logic rather than writing efficient code, and the organization of an assembled code can be easily changed simply by altering the probabilities stated in the compiler directives. The performance test run data should be easily translated into the compiler directives for optimization.

In a second aspect of the present invention, a process/system is presented for optimizing (or tuning) a program once compiled within its execution environment. This allows a program to be continually monitored and optimized according to its current execution environment. Further, there is no longer a need for a program to be optimized by a programmer for a specific hardware configuration. Potentially, the approach could help reduce development costs for those programs which are sensitive to the hardware environments within which they run. In addition, the process promotes optimal program performance for each node of a sysplex/network where a program is executed on nodes with different execution environments. Finally, the first aspect of the invention is applicable to any translatable high-level language which includes conditional syntactic constructs and to any computer system, while neither the programming language nor execution system employed are critical to the second aspect.

BRIEF DESCRIPTION OF DRAWINGS

These and other objects, advantages and features of the present invention will be more readily understood from the following detailed description of certain preferred embodiments of the present invention, when considered in conjunction with the accompanying drawings in which.

BEST MODE FOR CARRYING OUT THE INVENTION

Again, a first aspect of the present invention focuses on optimizing organization of multiple associated conditional paths within a conditional code segment to be compiled, while a second aspect of the invention provides a process/system for optimizing (or tuning) an assembled program within its current execution environment to achieve optimal performance. Both aspects of the present invention seek to optimize execution performance of an assembled code. The first aspect is applicable to any translatable high-level language which includes conditional syntactic constructs, while neither the programming language nor execution system employed are critical to the second aspect.

As most programmers know, a conditional branch instruction (such as would be generated by the familiar IF-THEN-ELSE statement or the SWITCH-CASE statement) can significantly degrade program execution. One of the techniques used by the compiler to reduce this impact is called "delayed branch." A compiler may implement a "delayed branch" technique by moving some of the instructions before a conditional branch instruction to after the branch instruction. Then, when the compiled code is executed, the pipeline is prevented from stalling by the instructions after the branch instruction that need to be executed anyway, whether the branch is taken or not. This technique does not always succeed, however, because insufficient instructions may be available to be moved to after the branch instruction to fill the delay slot and yet preserve program correctness.

Almost all known compiler techniques also do not try to prevent cache misses which might occur due to branch instructions. In such cases, the "branch penalty" is even more significant because fetching instructions from the main store takes an order of magnitude more time than fetching instructions from the cache. The first aspect of the invention described herein reduces the branch penalty by rearranging the compiled code for the conditional code segment. This rearrangement works best when the processor unit, like many of those available today, is preprogrammed to assume that a conditional path will not be taken. The proposed technique also reduces the probability of cache misses, for example, by placing the codes in the rearranged code segment by descending order of probability execution.

The solution presented herein for a conditional code segment having multiple conditional paths, is to include a probability compiler directive with each associated conditional path. Each probability compiler directive contains an indication of the approximate probability for satisfying the test condition of the condition path when the instruction is executed. Stated otherwise, the probability compiler directives specify, before compiling a program code, the probabilities that performance testing will pass through one or the other of the branches (or conditions) of a "conditional code segment" (which is used herein to include two or more conditional paths). Thus, pursuant to the invention a more efficient code organization is generated by performance test running a compiled program, collecting data on how often the various branches of a conditional code segment are actually called and providing this data to the programmer for possible correction of the probability compiler directives associated with the conditional paths of the conditional code segment and having the programmer make any necessary corrections.

Figure 1:
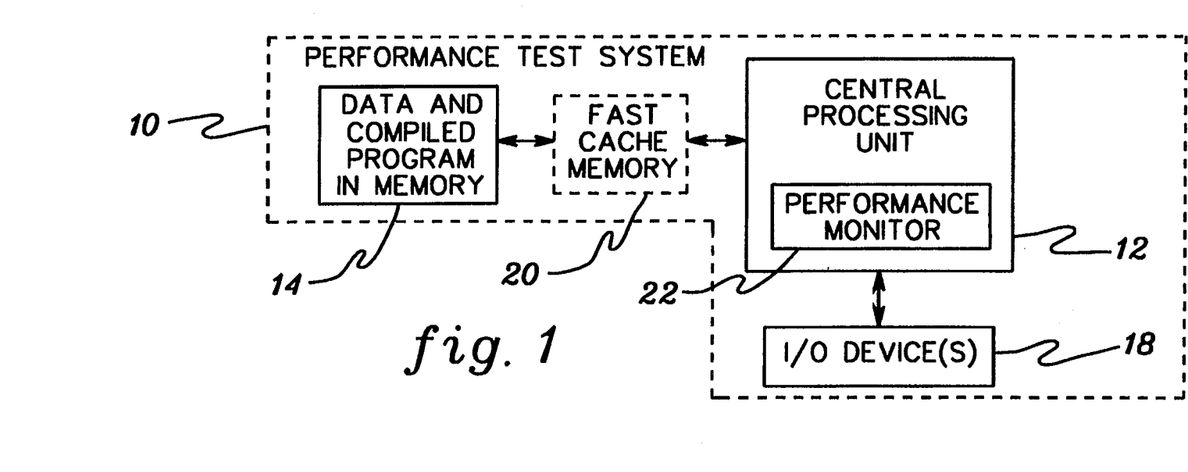
FIG. 1 is a block diagram of one embodiment of a program test system to employ a first performance optimization approach pursuant to the present invention (which focuses on optimizing the organization of associated conditional paths)

A high-level depiction of a performance test system, generally denoted 10, is shown in FIG. 1. System 10 includes a central processing unit (CPU) 12, data and program memory 14, and I/O device(s) 18. During performance testing, a programmer interfaces with the system through an appropriate I/O device 18 such as a video display terminal with a keyboard and/or keypad. A compiled program (or assembled code) resides within memory 14, which may, for example, comprise solid-state memory. The compiled program operates on data, also held in memory 14. In order to facilitate execution performance, a fast cache memory 20 is often disposed between solid-state memory 14 and CPU 12.

Pursuant to this first aspect of the present invention, a performance monitor 22 is provided within the central processing unit in order to track, for example, the number of occurrences of each conditional path during performance testing using available data. This execution information is then converted to corresponding probabilities for the associated conditional paths, which are then employed, for example, by the programmer to modify the compiler directives of the conditional paths before a re-compilation of the source program. Performance monitor 22 may include, for example, appropriate hardware registers within the CPU. One skilled in the art will readily recognize various approaches to implementing this monitor function. Further, monitoring of the conditional instruction executions can be implemented in either hardware or software.

Figure 2:
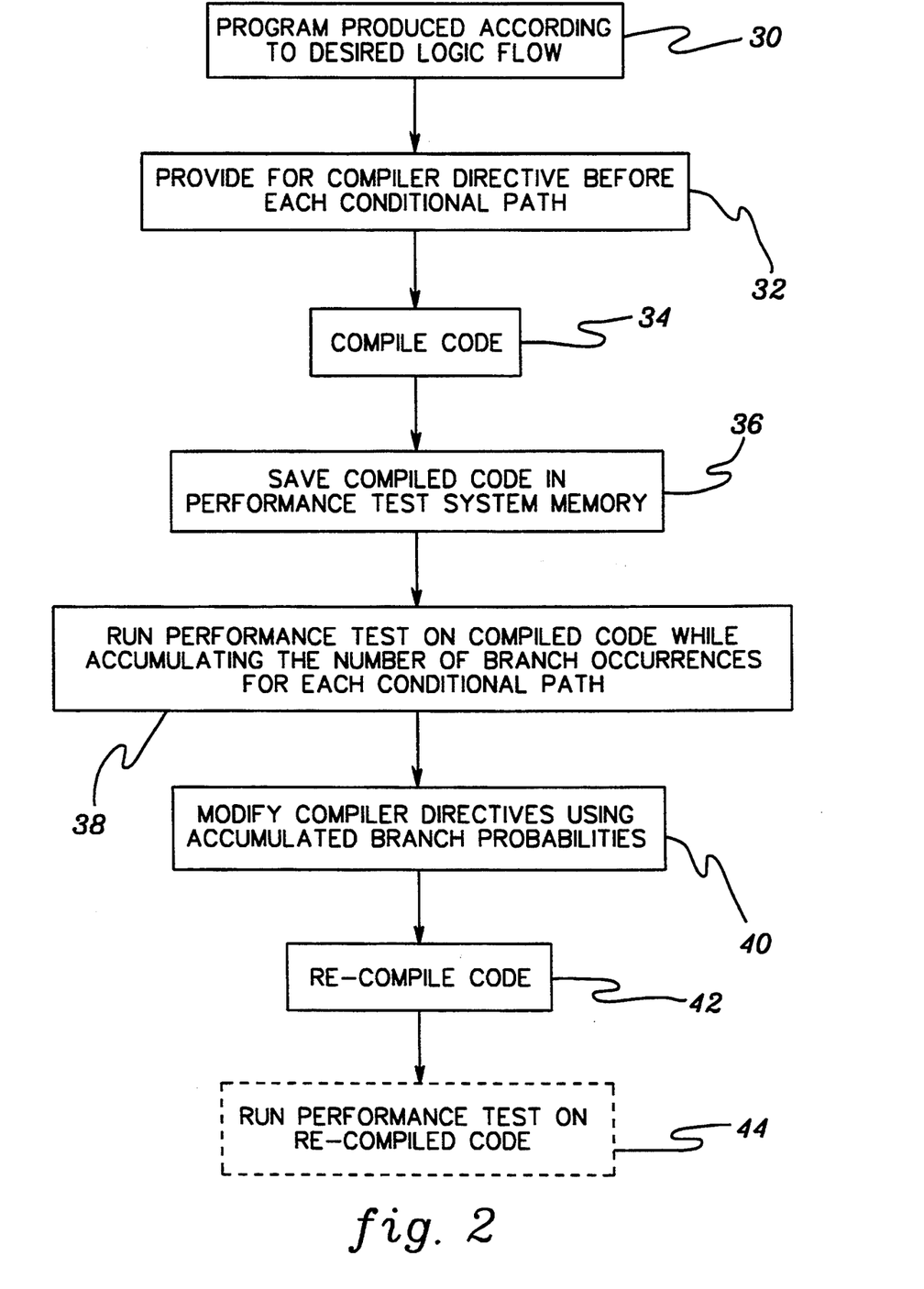
FIG. 2 is a processing flowchart of one embodiment of the first program performance optimization approach of the present invention.

FIG. 2 depicts one embodiment of a processing flowchart pursuant to this aspect of the present invention. As shown, a programmer writes in source code (of a high-level programming language) a program according to a perceived desirable logic flow, 30 "Program Produced According To Desired Logic Flow." A probability compiler directive is then associated with each test (i.e., conditional path) of a conditional code segment, 32 "Provide For Compiler Directive Before Each Conditional Path." Initially, the probability associated with the various compiler directives of a conditional code segment may be arbitrarily assigned. Alternatively, if the programmer has prior knowledge as to the likelihood that a particular branch will be taken, this information can be written into the compiler directives in the form of "gross" (or estimated) probabilities. The code is then compiled, 34 "Compile Code," and saved in a performance test system memory (14) (see FIG. 1), 36 "Save Code In Performance Test System Memory." Performance testing is conducted on the compiled code while branch execution information is accumulated within a performance monitor (22) (see FIG. 1) for a conditional code segment, 38 "Run Performance Test On Compiled Code While Accumulating The Number of Branch Occurrences For Each Conditional Path."

The resultant performance monitor totals, provided for example to a programmer through an appropriate input/output device, are used by the programmer to quickly modify the assigned probabilities of the probability compiler directives associated with the instructions of the conditional code segment, 40 "Modify Compiler Directives Using Accumulated Branch Probabilities." The program is then re-compiled, 42 "Re-compile Code," and if desired, performance testing is conducted on the re-compiled code to verify attainment of enhanced execution performance of the reorganized code, 44 "Run Performance Test On Re-compiled Code."

A sample compiler directive for a conditional path would be:

COND-PROBABILITY <floating-point number>

This probability directive, which is readily implementable by one of ordinary skill in the art, is inserted before any test statement or conditional path (for example, an IF or ELSIF statement) to tell the compiler (or its preprocessor) the likelihood of passing the subject test when the compiled code is run. (Also, the compiler (or its preprocessor) will need to be modified to operate on the novel probability compiler directive presented herein, which can be readily accomplished by one of ordinary skill in the art.) The floating point number should have a value less than 1.0 and greater than 0.0, and the sum of all probabilities stated in a conditional construct (i.e., conditional code segment) should sum to the value 1.0.

Using the new compiler directives, the compiler rearranges each conditional code segment according to the conditional probabilities inserted by the programmer in the manner most optimal for this particular computer, for example, with the instructions most likely to be executed placed at the top, the instructions moderately likely to be executed in the middle, and the instructions least likely to be executed at the bottom. The compiler then inserts the BRANCH or BRANCH ON CONDITION instructions at the appropriate locations of the assembled program code.

The scheme proposed herein can better be illustrated with a specific example. Consider a high-level language, conditional code segment such as:

```
#COND-PROBABILITY 0.2
IF condition-1 THEN
    body-1
#COND-PROBABILITY 0.5
ELSIF condition-2 THEN
    body-2
#COND-PROBABILITY 0.3
ELSE
    body-3
ENDIF;
```

Corresponding compiled codes, generated both with and without the probability compiler directive, are shown in the pseudo-codes presented below. On the left side is a sample code generated without compiler directives, while on the right side is pseudo-code generated using probability compiler directives pursuant to the present invent]on.

| Standard Compiled Code | Directive Compiled Code |
|---|---|
| test for condition-1; | test for condition-1; |
| branch-if-not-true to SEG2; | branch-if-true to SEG1; |
| "code for body-1" | test for condition-2; |
| branch to CONT; | branch-if-not-true to SEG3; |
| SEG2: test for condition-2; | "code for body-2"; |
| branch-if-not-true to SEG3; | branch to CONT; |
| "code for body-2"; | SEG3: "code for body-3" |
| branch to CONT; | branch to CONT; |
| SEG3: "code for body-3"; | SEG1: "code for body-1"; |
| CONT: | CONT: |

With the traditional optimization method evidenced by the pseudo-code on the left, not only are branch tests likely to be disbursed, but also the compiler (which is unaware of which condition is most likely to be satisfied) automatically arranges code segments in the same order in which they are written.

In contrast, with the use of probability compiler directives tests are clustered at the top in an ascending order of probability, followed immediately by the code instruction which is most likely to be executed. Thus, a cache miss for this code segment is less probable. Further, the assembled code on the right is a more efficient organization than the pseudo-code (not shown) which would result from using a combination of sub-routines and sub-routine calls. Use of sub-routines for cases less likely to occur costs machine cycles when the branch is actually taken.

More importantly, the proposed compiler directive scheme allows a programmer to concentrate on the logic rather on writing efficiently organized code. Equally important is that the organization of the assembled code can be changed easily by simply altering the probabilities stated in the directives of a conditional code segment and re-compiling the code. The technique presented can also be used for any conditional construct, such as a SWITCH-CASE statement of C (recognized to be logically equivalent to an IF-THEN-ELSE statement of PL/I) or a similar construct of any compilable high-level language. In addition, the process is independent of the order of resolution of relations between different parts of conditional constructs (e.g., such as correspondence between IF and ELSE parts of multiple nested IF/ELSE structures).

Further, the proposed technique can be easily extended to the case where two or more conditional code segments may be nested one within the other, as follows:

```
IF condition 1.1 THEN
    IF condition 1.1.1 THEN
        body 1.1.1
    ELSE
        body 1.1.2
    ENDIF
ELSIF condition 1.2 THEN
    body 1.2
ELSE
    body 1.3
ENDIF;
```

In this case, the probabilities stated in the compiler directives before conditional statements belonging to the same "level" (outer or inner) must add up to 1.0. For instance:

```
#COND-PROBABILITY 0.2  ─┐
IF condition 1.1 THEN    │
    #COND-PROBABILITY 0.3 ─┐  │
    IF condition 1.1.1 THEN │─1.0 │
        body 1.1.1          │     │─1.0
    #COND-PROBABILITY 0.7 ─┘     │
    ELSE                          │
        body 1.1.2                │
    ENDIF                         │
#COND-PROBABILITY 0.5  ──────────┤
ELSIF condition 1.2 THEN          │
    body 1.2                      │
#COND-PROBABILITY 0.3  ──────────┘
ELSE
    body 1.3
ENDIF;
```

In a second aspect of the present invention, a process and a system are provided to optimize organization of an assembled program for a particular execution environment (which may change with time). According to this aspect program execution statistics (e.g., likely direction of conditional branches, cache misses, frequency of instruction execution/data accesses) are accumulated, preferably along with both hardware and software environment information. A new hardware instruction can be employed to allow software to selectively start and stop collection of execution environment data so that information will be accumulated only when desired and limited to that program by its address range. Further, this new instruction preferably allows the use of separate data collection buffers for different programs and the tailoring of the types of information collected to the needs of a particular target program, optimizer and/or computer architecture/organization.

Figure 3:
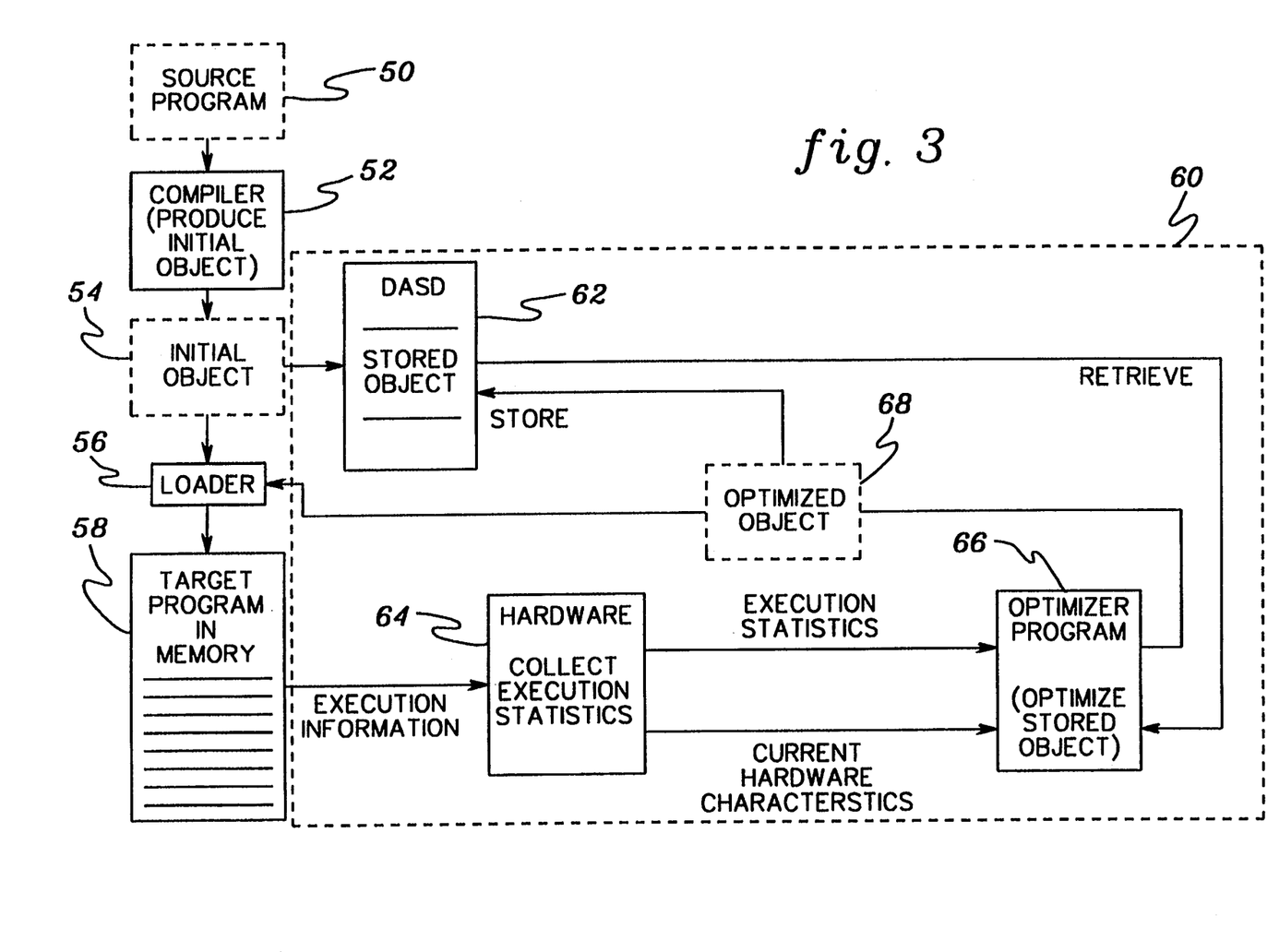
FIG. 3 is a block diagram of a second program performance optimization approach pursuant to the present invention (which uses accumulated execution statistics to re-organize an assembled code)

FIG. 3 depicts one embodiment of a system and process for optimizing compilation of a program based on an actual program execution environment. A source program 50 is written by a programmer in a desired logic flow and compiled in a compiler 52 which produces an initial "object" 54. (As used herein, "object" is synonymous with "assembled code" (i.e., compiled source program).) This initial object 54 is taken by a loader 56 (which includes a linkage editor) and, after address resolution, is inserted into a target program memory 58 for execution using available data, e.g., held in a separate memory (not shown). An optimization system 60 pursuant to the present invention, connected as shown in FIG. 3, receives initial object 54 in a DASD 62 (where the program is labeled as "stored object").

A hardware instruction 64 collects program execution statistics from a processor (not shown) running the target program saved in memory 58. The target program execution statistics and, preferably, hardware (and/or software) characteristics of the processing system, are provided by hardware 64 to an optimizer program 66. Optimizer program 66, which can comprise any optimization approach known in the open literature (e.g., see U.S. Pat. Nos.: 5,109,331; 4,642,765 and 4,802,091), retrieves the stored object data set from DASD 62 and optimizes the object to produce an optimized object 68. If generated, optimized object 68 in turn replaces the stored object on DASD 62 and in memory 58. Preferably, the optimization process is iterative. As the new target program is executed, additional statistics are collected by hardware 64 and program optimization processing is repeated.

As a program to be tuned is running, hardware instruction 64 collects statistics about the program's execution environment. The information collected could include: (1) likely direction of conditional branches (see Example 1 below); cache misses (see Example 2 below); or frequency of instruction execution/data accesses (see Example 3 below); etc. After a pre-specified period of time, the hardware monitor provides this statistical information for a given program (herein called the target program) to run-time optimizer program 66. The optimizer program uses the run-time statistics, and preferably the characteristics of the machine (such as supported instructions, machine-dependent instruction execution times, storage geometry, cache organization, etc.) to optimize organization of the target program. Once an optimized version of a program is produced, it replaces the current version of the target program. Thereafter, future optimizations of the target program could occur periodically, with each update of the assembled program replacing its previous version. Obviously, this assumes that there might have been sufficient environmental change to warrant updating of the target program. Thus, constant monitoring of the execution environment is possible to ensure that an optimized version of the assembled program is available at any desired run-time.

A detailed example of this program optimization aspect of the present invention is next presented in the context of IBM's ESA/390 architecture. However, the concepts presented herein are equally applicable to any hardware architecture and any compiled or translated programming language.

For purpose of explanation, a new instruction is defined. This new instruction allows software to selectively start and stop collection of execution environment data (to make it active only while the target program is running), to separate data collection buffers for different programs, and to tailor the types of information collected to the needs of a particular target program and/or optimizer. In microcoded machines, the new instruction also allows software to control the possible hardware overhead (i.e., microcode execution time) that may be associated with data collection by limiting the data collection only to the programs of interest and/or by selecting a particular subset of types of information to be collected.

As an alternative, other implementations may choose to use no special instruction and instead constantly monitor the execution environment information for all programs that are running, having software perform the sub-setting and separation of the collected information. Therefore, note that a new instruction is only one way of achieving the desired result. Other techniques for implementing this concept, such as using one or more control registers, are possible and will occur to those skilled in the art.

The hardware instruction used to collect execution environment data is referred to herein as CES (Collect Execution Statistics). CES is used to:

Initiate hardware starting and stopping of execution environment data recording;
Define the starting address and size of the recording area;
Define address space qualifications for virtual addressing schemes;
Define the range of storage addresses for which recording is to occur;
Specify the required set of data to be collected by hardware to
  minimize hardware overhead, and
  maximize recording area utilization.

The CES instruction format is as follows:
  CES recording_area_address, recordings_area_size, start_address, end_address, required_info_mask. 'recording_area_address Virtual address of the recording area in which statistics are to be recorded.
  A non-zero value indicates that the collection if statistics should be started, for the specified range of addresses (start_address-end_address), immediately after successful completion of this instruction. This indicates the beginning of a new monitoring period.
  A zero value indicates that collection of statistics should be terminated. This indicates the termination of the current monitoring period for the specified range of addresses (start_address-end_address).
  A non-zero return code is passed if there is no active monitoring period for the specified range of addresses.

| | |
|---|---|
| recording_area_size | Size of the recording area. |
| start_address | Virtual address of the first instruction of the range for which statistics are to be collected. |
| end_address | Virtual address of the last instruction of the range for which statistics are to be collected. |
| required_info_mask | Field defining the relevant information to be collected into the recording area during |

-continued this monitoring period.

Note that the actual format of the CES instruction might be varied at time of implementation. The CES instruction will be issued by the operating system prior to executing the target program. Software will manage the bit/field assignments of the statistical data to be collected, via setting the appropriate bits in the required_info_mask as they relate to the optimizer program and the target program. The collection of statistical data is recorded by the hardware based on the CES operands.

Figure 4:
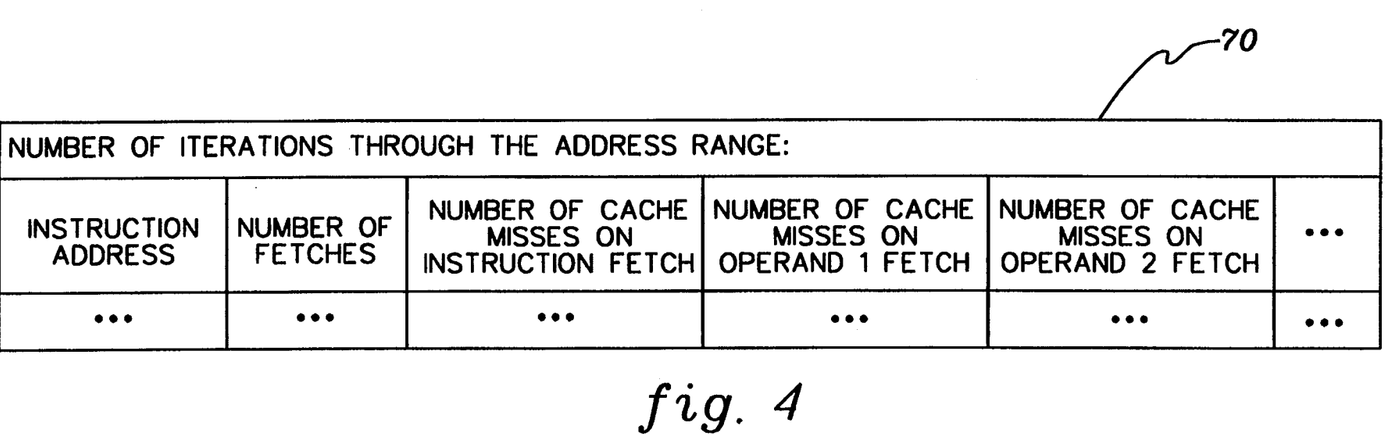
FIG. 4 depicts an example of a CES instruction data recording area format pursuant to the program performance optimization approach of FIG. 3.

An example CES instruction data recording area format is depicted in FIG. 4. The data block contains the number of iterations through the address range specified on the CES instruction, followed by a list of instruction addresses with statistical data collected for each instruction address, including: (1) the number of fetches for the instruction; (2) the number of cache misses on instruction fetch; (3) the number cache misses on fetching the first operand; and (4) the number of cache misses on fetching the second operand; etc.

Several examples of program optimization pursuant to this aspect of the present invention are presented below.

Example 1

Branch on Condition

TABLE 1

| Initial Code | Optimized Code |
|---|---|
| . . . . . | . . . . . |
| C. . . | C. . . |
| BC Y ── branch | BC X ── branch |
| - X - taken 99% | - Y - taken 1% |
| . . . . . of the | . . . . . of the |
| - Y - ◄── time | - X - ◄── time |
| . . . . . | . . . . . |

Table 1 illustrates an example of conditional branch optimization by restructuring an assembled code to minimize branching. Assume that for a given machine it is known that falling through a conditional branch is faster than taking a branch. Consider an initial sequence of instructions, which includes a COMPARE (C), BRANCH-ON-ZERO (BC) to location Y, followed by instruction lists starting at locations X and Y. The execution statistics collected by hardware indicate that the branch by the BC instruction is taken in 99% of the cases. The optimizer program will therefore generate code with the reverse condition and switch the order of the assembled code sections X and Y. This optimization will produce a re-organized instruction sequence which includes a COMPARE (C), BRANCH-ON-NON-ZERO (BC) to location X (which is the reverse of BC to location Y), followed by instruction lists starting at locations Y (now immediately following the BC instruction) and X. The resulting optimized instruction sequence would take the branch (BC) 1% of the time, thus allowing optimal branch performance ("fall through") 99% of the time.

Example 2

Tight Loop Localized To A Single Cache Line

TABLE 2

| Initial Code | Optimized Code |
|---|---|
| . . . . . | . . . . . |
| LOOP. . . . . ── cache | LOOP. . . . . ── cache |
| . . . . . boundary | . . . . . boundary |
| BC LOOP * | BC LOOP ** |
| . . . . . | . . . . . |
| . . . . . ── cache | . . . . . ── cache |
| . . . . . boundary | . . . . . boundary |

Where:
* = high frequency of cache misses, or use of two cache lines instead of one, due to loop cache misalignment; and
** = no cache misses, or less cache lines used (one vs. two), due to loop cache alignment Table 2 illustrates an example of tight loop localization to a single cache line. Given a machine where the CPU cache can only hold one cache line at a time, consider an initial sequence of instructions, starting at location LOOP and ending by a BRANCH-ON-CONDITION (BC) instruction to location LOOP, crossing the cache boundary and not reaching the cache boundary. Assume that the described initial instruction sequence fits within a cache line between the cache boundaries. Assume also that a program including the described instruction sequence spends most of its CPU time in this small loop. This loop of code fits within a single cache line for this machine, however the current object results in the mainline loop crossing a cache boundary. Due to the frequency of loop execution and the machine cache organization, this loop execution causes many cache misses or uses an extra cache line resulting in subsequent cache utilizations, and actually degrades the target program's optimal performance rather significantly. In this example, the optimizer program detects the cache misalignment and reproduces a new object (i.e., assembled code) such that the loop starting at location LOOP and ending with a BC to location LOOP is now cache-aligned (i.e., placed between two cache boundaries) and resides within a single cache line. As a result of this optimization step, the number of cache misses caused by iterative execution of the described tight loop are significantly reduced, and cache lines used are minimized.

Example 3

Restructured Branching and Cache Optimization

Figure 5:
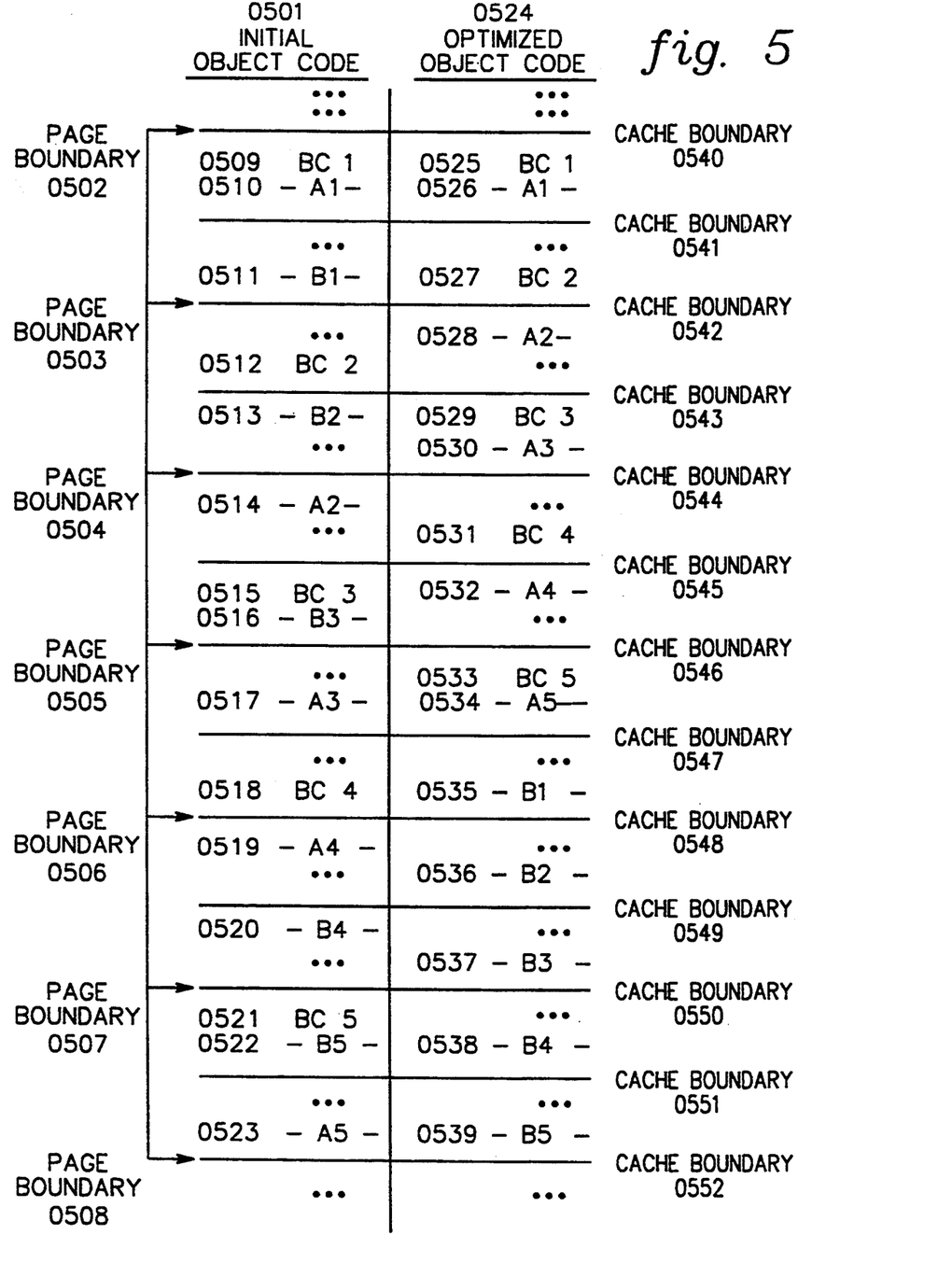
FIG. 5 depicts an example pursuant to the program performance optimization approach of FIG. 3 showing restructured branching with cache optimization and reduced paging.

FIG. 5 illustrates an example of restructured branching and cache optimization. This example combines the previous two relatively straight forward examples to demonstrate the versatility and complexity in which an optimizer program can be written. Assume, as in Example 1, that falling through a branch is quicker than actually taking a branch. In this example, the A path (i.e., A1, A2, . . . ) is the normally taken path for this environment, and the B path is the unlikely one for each BRANCH-ON-CONDITION (BC) instruction in the sequence. Consider the initial instruction sequence 0501 consisting of BC instructions 0509, 0512, 0515, 0518 & 0521 and instruction sequences immediately following the BC instructions or accessed by actually taking a branch A1 through A5 (0510, 0514, 0517, 0519 & 0523) and B1 through B5 (0511, 0513, 0516, 0520 & 0522), residing between page boundaries 0502 and 0508 and crossing page boundaries 0503, 0504, 0505, 0506, and 0507, wherein each page boundary includes two cache lines, such that the initial instruction sequence 0501 fits between cache boundaries 0540 and 0552 and crosses boundaries 0541, 0542, 0543, 0544, 0545, 0546, 0547, 0548, 0549, 0550, & 0551.

As a result of the optimization, the optimized instruction sequence 0524 is produced, which is organized such that the optimized program spends virtually all of its CPU time falling through branches (rather than branching) 0525, 0527, 0529, 0531 & 0533 to take the more likely execution paths A1 through A5 (0526, 0528, 0530, 0532 & 0534) and branches to less likely execution paths B1 through B5 (0535, 0536, 0537, 0538 & 0539). The optimized instruction sequence is also generated in such a way that it optimizes its "working" storage to contain only "mainline code" (as opposed to "non-mainline code"). The likely instruction sequences are collected between page boundaries 0502 and 0506 and cache boundaries 0540 and 0547, thus reducing the working set of real pages from 6 to 4 and the number of highly active cache lines from 12 to 7. This results in maximum cache unitization, minimized paging and optimal branch performance.

Note that page boundaries and cache size are depicted here for demonstrative purposes. The example would work with paging or without, and with a cache or without a cache.

To summarize, a first aspect of the present invention focuses on optimizing organization of multiple associated conditional paths within a conditional code segment. With a new compiler directive associated with each conditional path, a programmer has to specify a new probability (for example, obtained from performance test runs) and re-compile the source code to generate a more efficient assembled code. Thus, a programmer may concentrate on the logic rather than writing efficient code, and the organization of an assembled code can be easily changed simply by altering the probabilities stated in the compiler directives.

In a second aspect of the present invention, a process/system is presented for optimizing (or tuning) a program once compiled within its execution environment. This allows a program to be continually monitored and optimized according to a particular workload/execution environment. Further, there is no longer a need for a program to be optimized by a programmer relevant to the context of the present invention. Potentially, the approach could help reduce development costs for those programs which are sensitive to (or cognizant of) the hardware environments within which they run. Further, the process promotes optimal program performance for each node of a sysplex/network where a program is executed on nodes having different execution environments. Finally, the first aspect of the invention is applicable to any translatable high-level language which includes conditional syntactic constructs and to any computer system, while neither the programming language nor execution system employed are critical to the second aspect.

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

We claim:

1. A method for enhancing processor execution of a compilable high-level language, conditional code segment having at lest two associated conditional paths, said method comprising the steps of:
    (a) associating a different one of at least two probability compiler directives with each conditional path of said conditional code segment, each associated probability compiler directive being assigned an approximate probability for satisfying a test condition of the associated conditional path when said path is taken by a processor; and
    (b) compiling said conditional code segment, using a computer, into an assembled code segment according to the assigned probabilities of said probability compiler directives, said compiling including arranging said assembled code segment such that said conditional paths are placed in said assembled code segment in a manner that results in a shortest possible execution time for said processor.

2. The method of claim 1, further comprising the steps of:
    (c) performance testing said assembled code segment of step (b);
    (d) simultaneous with said step (c), collecting for each conditional path compiled into said assembled code segment performance test data;
    (e) revising assigned probabilities of said probability compiler directives, said assigned probabilities being revised to reflect said performance test data collected in said step (d); and
    (f) re-compiling said conditional code segment with said revised assigned probabilities of step (e) into an enhanced assembled code segment, said enhanced assembled code segment being arranged according to the revised probabilities assigned to said probability compiler directives such that conditional branches are disposed within said assembled code segment in a manner that results in a shortest possible execution time for said processor.

3. The method of claim 2, further comprising the step of repeating steps (c)–(f) at least one time.

4. The method of claim 1, wherein said conditional code segment comprises one of an IF-THEN-ELSE statement of language PL/I, COBOL, PASCAL, or ALGOL, an IF-THEN-ELSIF-ELSE statement of language FORTRAN-78, a SWITCH-CASE statement of language C, a SELECT statement of PL/I and a CASE statement of PASCAL.

5. The method of claim 1, wherein said approximate probability indication of said step (a) assigned to each probability compiler directive comprises a floating point number having a value x, wherein $0.0 < X < 1.0$, and wherein a summation of said floating-point numbers of said at least two probability compiler directives equals 1.0.

6. The method of claim 1, wherein said compiling step (b) includes arranging said assembled code segment such that said conditional paths are organized in said assembled code segment from most likely to be taken to least likely to be taken.

7. The method of claim 1, wherein said conditional code segment comprises an outer conditional code segment, said outer conditional code segment including at least one inner conditional code segment, and wherein said method further comprises the step of repeating steps (a) & (b) for each inner conditional code segment.

8. A programed computer system for enhancing processor execution of a compilable high-level language, conditional code segment having at least two associated conditional paths, said programmed computer system comprising:
   means for associating a different one of at least two probability compiler directives with each conditional path of said conditional code segment, each associated probability compiler directive being assigned an approximate probability for satisfying a test condition of the associated conditional path when said path is taken by a processor; and
   means for compiling said conditional code segment, using said programmed computer system, into an assembled code segment according to the assigned probabilities of said probability compiler directives, said means for compiling including means for arranging said assembled code segment such that said conditional paths are placed in said assembled code segment in a manner that results in a shortest possible execution time for said processor.

9. The programmed computer system of claim 8, further comprising:
   means for performance testing said assembled code segment;
   means for collecting for each conditional path compiled into said assembled code segment performance test data simultaneous with said performance testing;
   means for revising assigned probabilities of said probability compiler directives, said assigned probabilities being revised to reflect said collected performance test data; and
   means for re-compiling said conditional code segment with said revised assigned probabilities into an enhanced assembled code segment, said enhanced assembled code segment being arranged according to the revised probabilities assigned to said probability compiler directives such that conditional branches are disposed within said assembled code segment in a manner that results in a shortest possible execution time for said processor.

10. The programmed computer system of claim 9, further comprising means for repeating said performance testing, said collecting, said revising and said re-compiling at least one time.

11. The programmed computer system of claim 8, wherein said conditional code segment comprises one of an IF-THEN-ELSE statement of language PL/I, COBOL, PASCAL, or ALGOL, and IF-THEN-ELSIF-ELSE statement of language FORTRAN-78, a SWITCH-CASE statement of language C, a SELECT statement of PL/I and a CASE statement of PASCAL.

12. The programmed computer system of claim 8, wherein said approximate probability indication assigned to each probability compiler directive comprises a floating point number having a value x, wherein $0.0 < \times 1.0$, and wherein a summation of said floating-point numbers of said at least two probability compiler directives equals 1.0.

13. The programmed computer system of claim 8, wherein said means for compiling includes means for arranging said assembled code segment such that said conditional paths are organized in said assembled code segment from most likely to be taken to least likely to be taken.

14. The programmed computer system of claim 8, wherein said conditional code segment comprises an outer conditional code segment, said outer conditional code segment including at least one inner conditional code segment, and wherein said programmed computer system further comprises means for repeating said associating and said compiling for each inner conditional code segment.

15. A programmed computer having a memory, said memory having a conditional code segment of a compilable high-level language disposed therein, said conditional code segment comprising:
   at least two associated conditional paths; and
   at least two probability compiler directives, each probability compiler directive being associated with a different one of said at least two conditional paths, and each probability compiler directive indicating an approximate probability for satisfying a test condition of the associated conditional path when said conditional code segment is executed by said programmed computer.

16. The programmed computer of claim 15, wherein said conditional code segment comprises one of an IF statement, an ELSIF statement, an ELSE statement, a CASE statement, and a SELECT statement.

17. The programmed computer of claim 15, wherein said approximate probability indicated within each probability compiler directive comprises a floating-point number having a value x, wherein $0.0 < \times < 1.0$, and a sum of floating-point numbers assigned to said at least two probability compiler directives equals 1.0.

18. The programmed computer of claim 15, wherein said approximate probability indication of each probability compiler directive is modifiable.

* * * * *

UNITED STATES PATENT AND TRADEMARK OFFICE
CERTIFICATE OF CORRECTION

PATENT NO. : 5,452,457
DATED : Sep. 19, 1995
INVENTOR(S) : Alpert et al.

It is certified that error appears in the above-indentified patent and that said Letters Patent is hereby corrected as shown below:

Column 10, line 40, delete "'recording_area_address".

Column 10, between lines 40 & 41 insert --recording_area_address--.

Column 14, line 6, delete "lest" and substitute therefor --least--.

Signed and Sealed this

Second Day of January, 1996

Attest:

BRUCE LEHMAN

*Attesting Officer*     Commissioner of Patents and Trademarks